(12) United States Patent
Moody (10) Patent No.: US 6,675,076 B1
(45) Date of Patent: Jan. 6, 2004

(54) SYSTEM, AUTOPILOT SUPPLEMENT ASSEMBLY AND METHOD FOR INCREASING AUTOPILOT CONTROL AUTHORITY

(75) Inventor: Larry A. Moody, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/277,572

(22) Filed: Oct. 21, 2002

(51) Int. Cl.[7] ............................................... B64C 13/22
(52) U.S. Cl. ......................... 701/11; 244/221; 244/227; 244/232; 244/235
(58) Field of Search .............................. 701/11, 3, 4, 5, 701/10; 318/564; 244/235, 237, 87, 197, 90 R, 196, 221, 194, 223, 175, 75 R, 76 R, 227, 229, 232

(56) References Cited

U.S. PATENT DOCUMENTS

| | | | |
|---|---|---|---|
| 4,924,401 A | | 5/1990 | Bice et al. |
| 5,493,497 A | * | 2/1996 | Buus ........................... 244/194 |
| 5,782,436 A | | 7/1998 | Pohling |
| 5,806,806 A | * | 9/1998 | Boehringer et al. ......... 244/196 |
| 5,868,359 A | * | 2/1999 | Cartmell et al. ............. 244/223 |
| 6,021,374 A | | 2/2000 | Wood |
| 6,443,399 B1 | * | 9/2002 | Yount et al. ................. 244/196 |
| 6,507,776 B1 | * | 1/2003 | Fox, III ......................... 701/11 |
| 2003/0034902 A1 | * | 2/2003 | Dickau ........................ 340/945 |
| 2003/0125848 A1 | * | 7/2003 | Otake et al. ..................... 701/3 |

OTHER PUBLICATIONS

Donald Swihart, Finley Barfield, Bertil Brannstrom, Michael Cawood, Russell Turner, Jonas Lovgren; *Results of a Joint US/Swedish Auto Ground Collision Avoidance System Program*; 1998; 8 pages; ICAS and AIAA; 21st ICAS Congress; Melbourne, Australia; A98–31473.

Major Michael L. Moroze, Dr. Michael P. Snow; *Causes and Remedies of Controlled Flight into Terrain in Military and Civil Aviation*; 1999; 6 pages; Cleared by ASC–99–0766 and SAF/PAS 99–0344; ARFL/HECI,Wright–Patterson Air Force Base, Ohio.

Associated Press; *New air navigation system could foil future Sep. 11–type hijacking*; Oct. 10, 2002; 2 pages; HeraldNet; available at <http://www.hearaldnet.com/Stories/02/10/10/15929266.cfm>.

\* cited by examiner

*Primary Examiner*—Thomas G. Black
*Assistant Examiner*—Tuan C To
(74) *Attorney, Agent, or Firm*—Alston & Bird LLP (57) ABSTRACT

A system is provided for increasing autopilot control authority in a vehicle, such as aircraft including mechanical control systems. The system includes an autopilot system, a control element and an autopilot supplement assembly. The autopilot system can automatically control the vehicle by applying a variable autopilot force to control surfaces. The control element can control the vehicle by applying a variable control force to control surfaces, where the control force acts counter to the autopilot force. The autopilot supplement assembly can measure the control force and, in turn, determine a variable supplemental force. Thereafter, the autopilot supplement assembly can apply the supplemental force to the control surfaces such that the sum of the supplemental force and the autopilot force is greater than the control force. Thus, the system may provide the benefits of systems that require full control authority to vehicles such as aircraft that include mechanical control systems.

20 Claims, 4 Drawing Sheets

SYSTEM, AUTOPILOT SUPPLEMENT ASSEMBLY AND METHOD FOR INCREASING AUTOPILOT CONTROL AUTHORITY

FIELD OF THE INVENTION

The present invention relates generally to systems and methods for increasing autopilot control authority and, more particularly, relates to systems and methods for increasing autopilot control authority in vehicles having mechanical flight control systems, such as to reduce Controlled Flight into Terrain (CFIT) accidents in aircraft.

BACKGROUND OF THE INVENTION

An unacceptable number of aircraft crashes occur every year. In fact, this number has, on average, shown no significant sign of diminishing since 1976, in spite of advances in almost every aspect of aircraft technology. For example, most aircraft are now equipped with an inertial reference system (IRS) which allows them to determine their position after any interval from take-off. The IRS provides the components of the velocity and acceleration vectors of the aircraft. It is possible to derive position data from this data; however, the position has an associated degree of uncertainty. The position data from the IRS may be compared with position data provided by other radio navigational means, e.g., from a Global Positioning System (GPS), which relies on satellites and which provides fairly precise position data with respect to latitude and longitude. Newer GPS systems can establish the aircraft position and altitude by triangulation using four or more satellites.

Even with these increasingly sophisticated systems providing position information, aircraft still crash every year. Investigations into the causes of aircraft crash incidents frequently reveal that the aircraft was operating normally when the crash occurred, i.e., the cause of the crash incident could not be attributed to a system fault. In these types of incidents, often referred to as a Controlled Flight into Terrain (CFIT) accidents or events, the cause is given as pilot error. However, although the pilot may have contributed to the event, had the pilot been given sufficient warning that, for whatever reason, the aircraft was in imminent danger of crashing, evasive action could have been taken and ground contact avoided. Thus, alerting systems such as Ground Proximity Warning Systems (GPWS) and Enhanced Ground Proximity Warning Systems (EGPWS) have been developed as partial solutions to this problem.

Generally, the GPWS is a system designed to provide adequate warning of terrain contact, while accounting for such items as crew recognition and reaction times. More particularly, the GPWS provides a look-down capability that takes into account the rise of terrain along with a projection of that terrain into the aircraft's flight path. In turn, the GPWS combines the projection of the terrain into the flight path with piloting information to thereby provide an aural indication that a dangerous situation is impending. The EGPWS includes all of the features as the GPWS, but the EGPWS also includes a predictive component. This predictive component enables the EGPWS to provide more warning time as compared to the GPWS. In addition, the EGPWS also incorporates the use of a worldwide digital terrain elevation database and a color-coded display of threat terrain.

Whereas systems such as the GPWS and EGPWS are adequate in alerting aircraft crew of impending dangers, such alerting systems cannot reduce CFIT accidents in situations where the aircraft crew cannot heed the warning of the alerting system and maneuver the aircraft to avoid terrain impact, such as when the crew suffer from spatial disorientation or g-induced loss of conscious. Thus, systems such as the automatic ground collision avoidance system (Auto-GCAS), were developed to address such situations. In this regard, extending the technologies of the GPWS and the EGPWS, the Auto-GCAS has the ability to take control of the aircraft and execute a recovery to avoid terrain impact.

In general, the Auto-GCAS provides aircraft crew with an indication of the aircraft's descent toward terrain and executes an automatic recovery. More particularly, as the Auto-GCAS has been implemented on an F-16 test aircraft, upon system activation, horizontal chevrons (><) appear at the side of the pilot's Heads-Up Display (HUD) as the aircraft maneuvers toward the ground or at low altitude. Then, if the Auto-GCAS determines that a collision avoidance maneuver within a defined period of time is required to avoid terrain, the chevrons begin to move toward each other. If the aircraft has not performed the fly-up maneuver by the time the chevrons meet, the Auto-GCAS automatically initiates a collision avoidance maneuver without further awaiting pilot intervention.

In addition to Auto-GCAS, other systems have been proposed that can take control of an aircraft in various situations. One such system, referred to as "required navigation procedures," has been proposed by the Federal Aviation Administration (FAA) as a navigation and separation system. In this regard, the required navigation procedures system operates by sending navigational information to the aircraft from a ground controller. With the navigational information, then, the aircraft autopilot system can take control of the aircraft to maneuver the aircraft to the commanded location, regardless of pilot inputs to the contrary.

Whereas systems such as the Auto-GCAS and the required navigation procedures system are beneficial in reducing CFIT accidents, such systems are not typically compatible with all types of aircraft. In this regard, the Auto-GCAS and required navigation procedures system are designed for aircraft having full authority fly-by-wire control systems. Thus, such systems are typically not compatible with aircraft having other types of control systems. For example, neither the Auto-GCAS nor the required navigation procedures system is compatible with aircraft, such as the Boeing 767-200 aircraft, that have mechanical control systems.

SUMMARY OF THE INVENTION

In light of the foregoing background, embodiments of the present invention provide a system, autopilot supplement assembly and method for increasing autopilot control authority, such as during automatic collision avoidance maneuvers, FAA commanded navigation, or during activation of any other system that requires full control authority. Advantageously, the system, autopilot supplement assembly and method of embodiments of the present invention are capable of increasing autopilot control authority in a vehicle, such as an aircraft, where the vehicle includes a mechanical flight control system. Embodiments of the system, autopilot supplement assembly and method are capable of increasing the autopilot authority by supplementing the force applied by an autopilot system to at least one control surface of the vehicle such that force imparted by an operator of the vehicle cannot override the autopilot system. Advantageously, the amount of supplemental force is based upon the amount of force imparted counter to the autopilot force, such as the force applied by an operator of the vehicle. Therefore, embodiments of the system, autopilot supplement assembly and method are capable of providing the benefits of Auto-GCAS, the required navigation procedures system or any other such systems that require full control authority of vehicles such as aircraft that have mechanical control systems. Additionally, embodiments of the system, autopilot supplement assembly and method are adapted such that, should the autopilot supplement assembly fail, control force can be applied to override the autopilot force to thereby allow an operator to control the vehicle.

According to one aspect of the present invention a system is provided for increasing autopilot control authority in a vehicle. The system includes an autopilot system, at least one control element and an autopilot supplement assembly. The autopilot system is capable of automatically controlling the vehicle by applying a variable autopilot force to at least one control surface of the vehicle. The control element, on the other hand, is capable of controlling the vehicle by applying a variable control force to control surfaces of the vehicle. In this regard, the control force acts on the control surfaces counter to the autopilot force.

The autopilot supplement assembly of the system is connected to the control element and the control surfaces of the vehicle. As such, the autopilot supplement assembly is capable of measuring the control force. From the measured control force, the autopilot supplement assembly is capable of determining a variable supplemental force. Thereafter, the autopilot supplement assembly is capable of applying a supplemental force to the control surfaces, where the supplemental force acts on the control surfaces in concert with the autopilot force and counter to the control force. In this regard, the sum of the supplemental force and the autopilot force equals a total force that is greater than the control force.

The autopilot supplement assembly can comprise at least one transducer, a controller and at least one cable tension servo. The transducers can be mechanically connected to the control element such that the transducers can measure the control force. In turn, the controller, which can be electrically connected to the transducers, can determine the supplemental force based upon the control force measured by the transducers. The cable tension servos can be electrically connected to the controller and mechanically connected to the control cables and, thus, the control surfaces. As such, the cable tension servos can apply the variable supplemental force to the control surfaces.

The system may be configured to provide the supplemental force under one or more predefined conditions. According to one embodiment, the autopilot supplement assembly is capable of applying the supplemental force when the control force is at least a predefined percentage of a maximum autopilot force. For example, the autopilot supplement assembly can be capable of applying the supplemental force when the control force is at least ninety percent of the maximum autopilot force. In another embodiment, the autopilot supplement assembly is capable of applying the supplemental force when the control force is greater than the maximum autopilot force. The vehicle can comprise an aircraft including a full control authority system capable of commanding the aircraft to perform one or more commanded maneuvers. For example, the full control authority system can comprise an automatic ground collision avoidance system (Auto-GCAS) capable of determining that a collision avoidance maneuver within a defined period of time is required to avoid terrain. In such embodiments, the autopilot supplement assembly can apply the supplemental force when the full control authority system initiates a commanded maneuver, such as when the Auto-GCAS determines that a collision avoidance maneuver is required.

An autopilot supplement assembly and method of increasing autopilot control authority are also provided.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the present invention provide a system, autopilot supplement assembly and method of increasing autopilot authority in a vehicle. The system, autopilot supplement assembly and method can advantageously be implemented in any one of a number of different vehicles capable of autopilot operation and including a mechanical control system. In this regard, the following will describe the system, autopilot supplement assembly and method implemented in an aircraft capable of autopilot operation and including a mechanical flight control system. It should be understood, however, that an aircraft is only one of a number of different vehicles capable of taking advantage of the present invention. For example, the vehicle can comprise a marine vessel with onboard automatic navigation and guidance systems.

Figure 1:
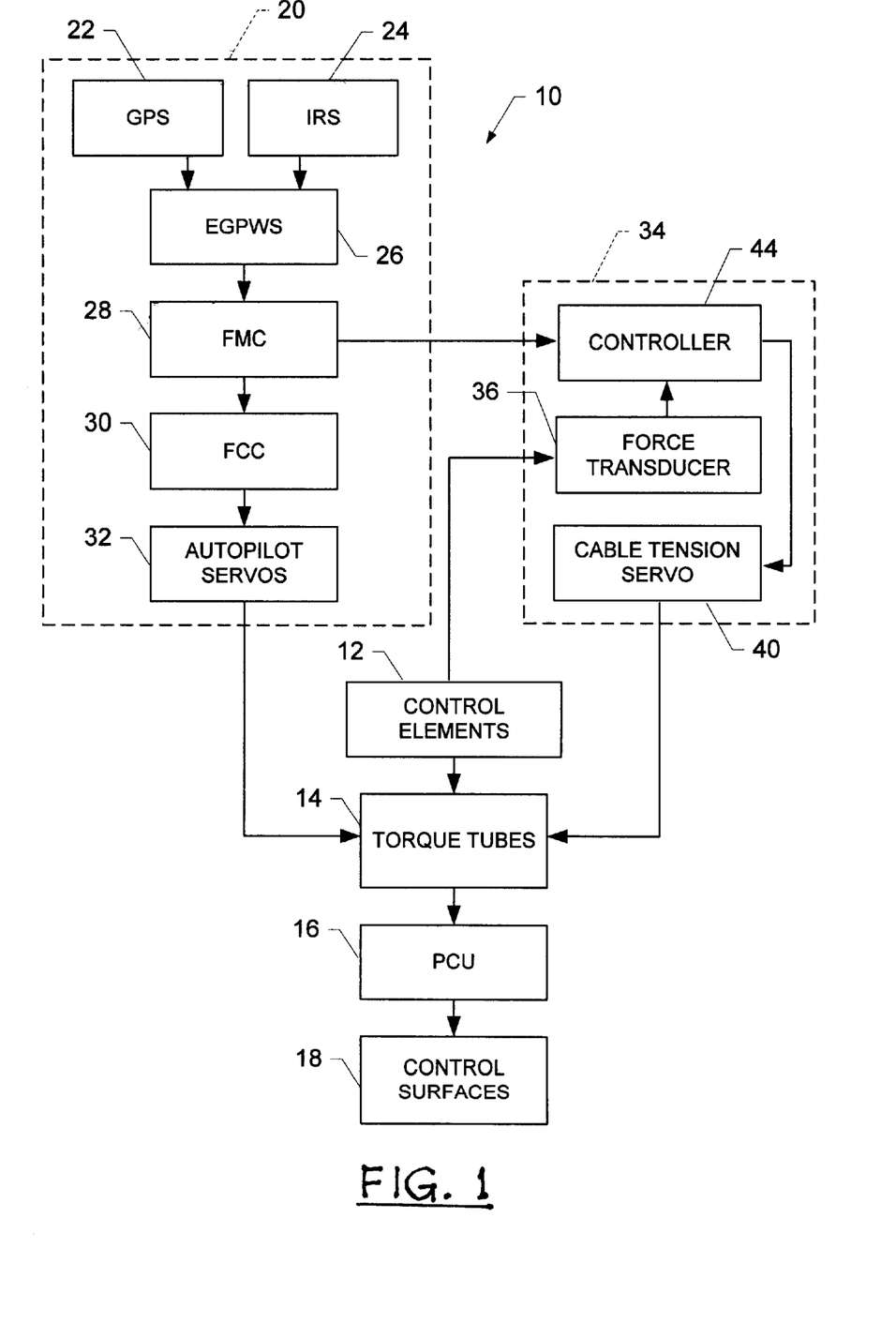
FIG. 1 is a block diagram of a system for increasing autopilot control authority in a vehicle according to one advantageous embodiment of the present invention where the vehicle comprises an aircraft.

Referring to FIG. 1, according to one embodiment of the present invention, a system 10 is provided for increasing autopilot authority in a vehicle such as an aircraft. The aircraft includes a mechanical control system capable of controlling movement of the aircraft. As is known to those skilled in the art, the mechanical control system comprises a series of interconnected cable loops each comprising cables, pulleys, levers and torque tubes that control flight control surfaces such as elevators, rudders or ailerons, or control valves or other mechanisms in the aircraft. As input to the control system, the aircraft includes one or more mechanical control elements 12, such as control columns and/or rudder peddles, that allow an operator to manually control the aircraft. In this regard, the control elements can apply a variable control force to torque tubes 14 within the mechanical control system. As will be appreciated by those skilled in the art, as the mechanical control system is comprised of cable loops, the control force can be defined as the tension in the cables in the cable loop including the control elements and the torque tubes.

As is well known to those skilled in the art, the force applied to the torque tubes is not typically significant enough to directly move the control surfaces of the aircraft and, as such, the torque tubes 14 transfer the control force to hydraulic actuators, which are often referred to as power control units (PCUs) 16. The hydraulics within the PCUs, then, are capable of producing an output movement with a force significant enough to rotate one or more control surfaces 18 of the aircraft into a desired position to thereby control the aircraft. Therefore, the control force is applied to the control surfaces to control the aircraft.

In addition to the control elements 12, the aircraft can be controlled automatically by means of an autopilot system 20 capable of operating the aircraft in an autopilot mode. In this regard, the autopilot system can include one or more systems well known to those skilled in the art that are capable of providing position and/or movement information relating to the aircraft. For example, the autopilot system can include a global positioning system (GPS) 22 and/or an inertial reference system (IRS) 24 capable of providing positioning, velocity and/or acceleration information relating to the aircraft. The GPS and/or IRS can be electrically connected to a flight management computer (FMC) 28, which receives the positioning, velocity and/or acceleration information from the GPS and/or IRS. In a typical aircraft, the FMC interconnects flight deck displays (not shown) and a Flight Management System—Control Display Unit (FMS-CDU) (also not shown). During autopilot operation, the FMC provides lateral (LNAV) and vertical (VNAV) guidance signals to a flight control computer (FCC) 30, which may include an autopilot flight director system (AFDS).

The FMC 28 can determine the LNAV and VNAV signals in any one of a number of different conventional manners. In addition, the aircraft can include any of a number of full control authority systems designed to control the aircraft to perform one or more commanded maneuvers. For example, the aircraft can include the "required navigation procedures" system proposed by the FAA. Additionally, or alternatively, the aircraft can include an automatic ground collision avoidance system (Auto-GCAS) capable of determining a flight path angle the aircraft should follow to avoid collision with terrain and/or an obstacle. In such an embodiment, as shown, the GPS 22 and IRS 24 can be electrically connected to a ground proximity warning system (GPWS) or, more typically, an enhanced ground proximity warning system (EGPWS) 26, which receives the positioning, velocity and/or acceleration information from the GPS and/or IRS.

As is well known to those skilled in the art, the EGPWS 26 includes a world-wide terrain/obstacle database that, along with the positioning, velocity and/or acceleration information from the GPS 22 and/or IRS 24, allows the EGPWS to provide a warning of future impact of the aircraft with terrain and/or an obstacle. More particularly, the EGPWS can provide a warning by determining a time to impact. The FMC 28, then, can include an Auto-GCAS capable of determining when a collision avoidance maneuver within a defined period of time is required to avoid terrain, and thereafter determining a commanded flight path angle the aircraft should follow to avoid collision with the terrain. For more information on such an Auto-GCAS, see U.S. Pat. No. 4,924,401 entitled: AIRCRAFT GROUND COLLISION AVOIDANCE AND AUTORECOVERY SYSTEMS DEVICE, issued May 8, 1990 to Bice et al., the contents of which is hereby incorporated by reference in its entirety.

However the LNAV and VNAV signals are determined, the FCC 30 can generate guidance signals from the LNAV and VNAV signals, and thereafter activate the aircraft's autopilot servos 32. The autopilot servos, in turn, provide variable autopilot force to the torque tubes 14 within the mechanical control system. Similar to before, the torque tubes transfer the autopilot force to the PCUs 16, which thereafter produce an output movement to rotate the control surfaces 18 of the aircraft into a desired position. Like the control force, therefore, the autopilot force is applied to the control surfaces to control the aircraft. Also like the control force, it will be appreciated that the autopilot force can be defined as the tension in the cables in the cable loop including the autopilot servos and the torque tubes.

In conventional operation, the control authority of the control elements 12, as determined by the control force, can be greater than the control authority of the autopilot system 20, as determined by the autopilot force. In such operation, control of the aircraft is determined by the greater force as between the control force and the autopilot force. As such, the control elements can provide control force counter to the autopilot force to override the autopilot system during operation. In some instances, however, it would be desirable to increase the autopilot control authority such that the autopilot control authority exceeds the control authority of the control elements. For example, in instances in which the autopilot system is controlling movement of the aircraft away from a potential collision with terrain and/or an obstacle, it would be desirable to prevent the control elements from overriding the autopilot system.

Therefore, the system 10 of one embodiment of the present invention includes an autopilot supplement assembly 34 that is capable of applying a variable supplemental force to the torque tubes 14 and, therefore, the control surfaces 18 of the aircraft. In this regard, the autopilot supplement assembly is capable of applying the supplemental force such that the sum of the supplemental force and the autopilot force equals a total force that exceeds the control force. As such, the control surfaces can be controlled by the total force (i.e., sum of the supplemental force and autopilot force), which is greater than the control force. Advantageously, the autopilot supplement assembly is capable of determining the supplemental force to apply based upon the control force applied by the control elements 12. In this regard, the autopilot supplement assembly includes at least one force transducer 36 mechanically connected to one or more of the control elements.

Figure 2:
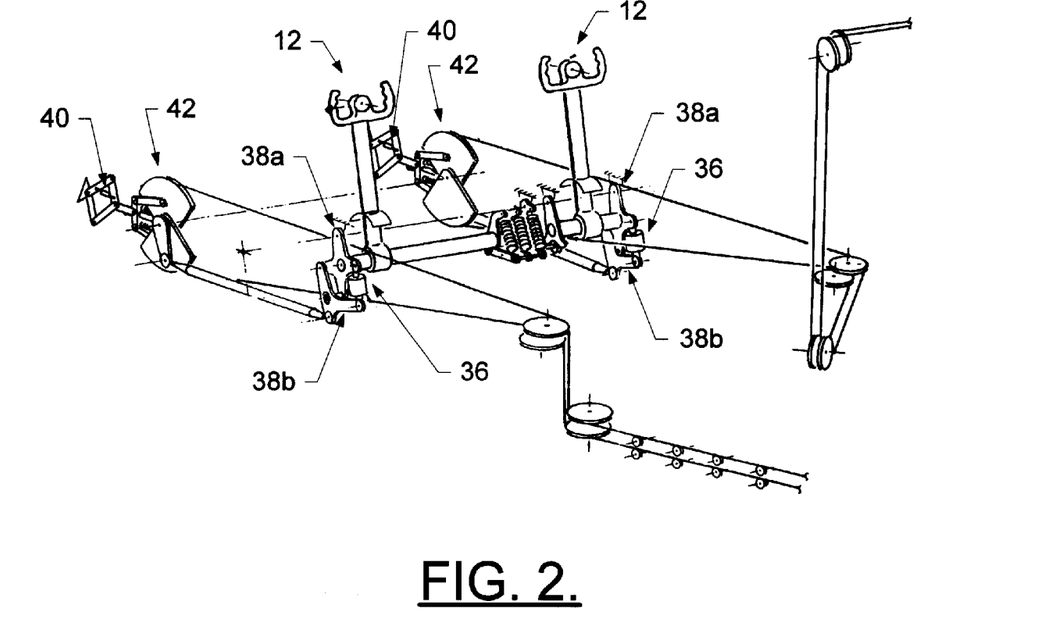
FIG. 2 is a schematic perspective illustration of a portion of the mechanical control system of one type of vehicle including an autopilot supplement assembly according to one aspect of the present invention.

The force transducers 36 are capable of measuring the control force applied by the respective control elements 12 to the torque tubes 14 and, thus, the control surfaces 18, where the control force is applied counter to the autopilot force. Each force transducer can be disposed in any of a number of different manners in the cable loop between the control elements and the torque tubes. In one embodiment, for example, each force transducer is secured to two levers 38a and 38b, one of which (38a) is mechanically connected to a respective control element, as shown in FIG. 2. From the foregoing, it will be appreciated that the force measured by the force transducer is defined as tension caused by the control elements in the cables of the cable loop within which the force transducer and the control elements are disposed. Advantageously, the force transducer can comprise a force transducer conventionally existing in the mechanical control system of the aircraft, such as is the case in the portion of the mechanical control system of a 767-200 model aircraft manufactured by The Boeing Company, illustrated in FIG. 2.

Figure 3:
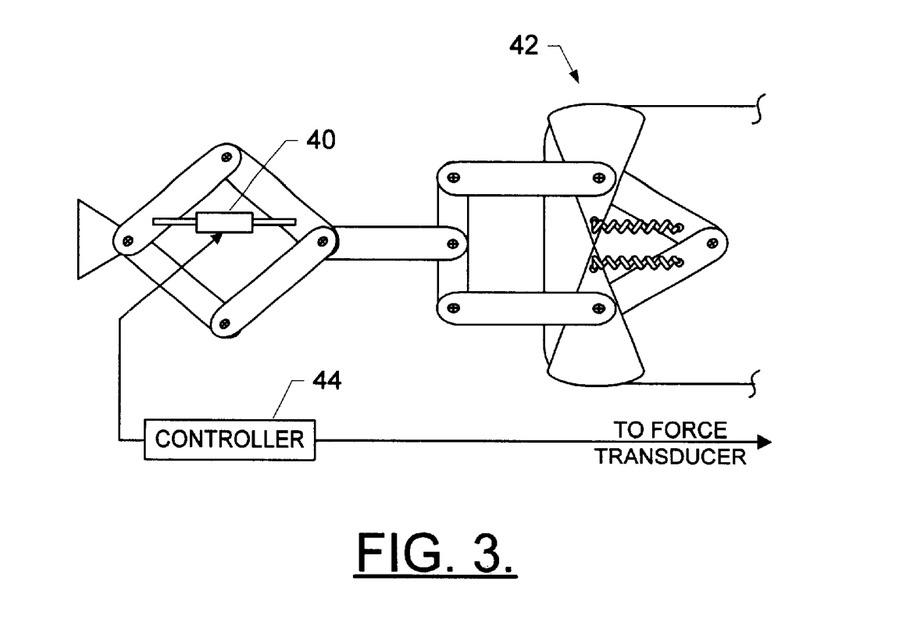
FIG. 3 is a close-up schematic front illustration of a portion of the mechanical control system illustrated in FIG. 2 including a portion of the autopilot supplement assembly.

Based upon the measured control force, the autopilot supplement assembly 34 is capable of applying supplemental force to the torque tubes 14 counter to the control force and with the autopilot force to thereby increase autopilot authority. To apply the supplemental force, then, the autopilot supplement assembly 34 includes at least one cable tension servo 40. The cable tension servos can comprise any of a number of different servo devices capable of applying the supplemental force to the torque tubes counter to the control force. The cable tension servos can be located in any one of a number of different locations relative to the torque tubes, such as in the cable loop between the control elements and the torque tubes. For example, as shown in FIGS. 2 and 3, the cable tension servos can be disposed on cable tension regulators 42 connected to the bulkhead of the aircraft and located in the cable loop between the control elements 12 and the torque tubes, as such are known to those skilled in the art. In this regard, the cable tension servos can operate to extend or contract to thereby increase or decrease tension in the cables between the control elements and the torque tubes. The amount of extension or contraction will vary depending upon the amount of supplemental force imparted by the cable tension servo but, in one embodiment, the extension or contraction would typically not exceed three inches.

To determine the supplemental force and control the cable tension servos 40 to apply the supplemental force, the autopilot supplement assembly 34 includes a controller 44. The controller is capable of receiving the measured control force and thereafter determining whether to apply the supplemental force to the torque tubes 14 and, if so, an amount of supplemental force to apply to the torque tubes. In this regard, the controller can comprise any of a number of different processing devices. The controller can be disposed in any location on the aircraft relative to the force transducers 36, such as in the forward equipment bay of the aircraft.

The controller 44 can determine when to apply the supplemental force in any one of a number of different manners. For example, the controller may be designed to apply the supplemental force if the control force approaches or exceeds the maximum autopilot force such that the aircraft remains under automated control. In this regard, the controller can compare the measured control force with the maximum autopilot force capable of being applied to the torque tubes 14 by the autopilot system 20. If the measured control force is greater than the maximum autopilot force, then the controller can determine that the supplemental force is to be applied. Alternatively, the controller can determine to apply the supplemental force when the measured control force is greater than a predefined percentage of the maximum autopilot force. For example, when the maximum autopilot force is 69 lbs (the typical maximum autopilot force for longitudinal elevators), the controller can determine to apply the supplemental force when the measured control force is greater than 90% of the maximum autopilot force, or greater than approximately 62 lbs.

In one advantageous embodiment where the aircraft includes a full control authority system, such as a required navigation procedures system and/or an Auto-GCAS, for example, the controller 44 can determine to apply the supplemental force when two conditions are concurrently met: (1) the measured control force is greater than a predefined percentage of the maximum autopilot force, and (2) the full control authority system has initiated a commanded maneuver. The controller can determine if the full control authority system has initiated a commanded maneuver in any one of a number of different manners, such as by receiving an indication from the FMC 28, as shown in FIG. 1. By requiring both conditions to be met, the controller can limit the increase in autopilot control authority to those situations in which the control element is attempting to override the autopilot system, and in which the Auto-GCAS, for example, has determined that a collision avoidance maneuver within a defined period of time is required to avoid terrain and/or obstacles.

In addition to determining when to apply the supplemental force, the controller 44 can determine the amount of supplemental force the cable tension servos 40 should apply to the torque tubes 14 and, thus, the control surfaces 18 of the aircraft. The amount of supplemental force to apply can vary and can be determined in any one of a number of different manners. In one embodiment, for example, the amount of supplemental force is determined to equal the difference of the control force and the maximum autopilot force (or predefined percentage thereof), where the difference is multiplied by a gain. In mathematical terms, the supplemental force, Fs, can be determined as follows:

$$Fs = G \times (Fc - F\ max)$$

In the foregoing equation, Fc represents the control force, Fmax represents the maximum autopilot force (or predefined percentage of the maximum autopilot force), and G represents the gain. The gain can comprise any of a number of different values, such as a scalar, a scheduled value (from a look up table of values that are based on aircraft state information), and/or a value determined according to a function of some other sensor (such as the rate of change of the control force, which could enable a slightly faster response), or any combination of these types of values. To prevent the supplemental force from counteracting the autopilot force, in a preferred embodiment a constraint is imposed such that if Fs<=0, then Fs is set to zero.

In any event of determining the amount of supplemental force, the force transducers 36 are capable of repeatedly measuring the control force such that the controller 44 is capable of repeatedly determining whether, and in what amount, to apply the supplemental force. By applying the supplemental force, then, the autopilot supplement assembly 34 can offset the control force such that the net force effectuated on the torque tubes 14, and thus the control surfaces 18, is greater than the control force.

It will be appreciated that, at some point, one or more of the cable tension servos 40 may fail. In this regard, if one or more of the cable tension servos fail, such cable tension servos will typically fail by failing to apply the supplemental force to the torque tubes 14 and, therefore, the control surfaces 18. Advantageously, in such instances, the control elements 12 can apply the control force to thereby override the autopilot system 20 because the amount of supplemental force is dependent upon the measured control force. Thus, in an event of failure of one or more of the cable tension servos, an operator of the vehicle or aircraft can be capable of controlling operation of the vehicle or aircraft.

In other instances, one or more cable tension servos 40 may fail by applying an amount of supplemental force that the controller 44 cannot vary in a manner such as described above. In such instances, presuming the autopilot system 20 remains capable of applying the autopilot force, the control elements 12 can apply sufficient control force to override the autopilot force. It will be appreciated, however, that the range of motion of the control elements to apply the control force may be limited in such instances based upon the amount of applied supplemental force. As such, the control force applied to the control surfaces 18 in such instances may only be capable of controlling movement of the vehicle with a limited amount of deflection.

Figure 4:
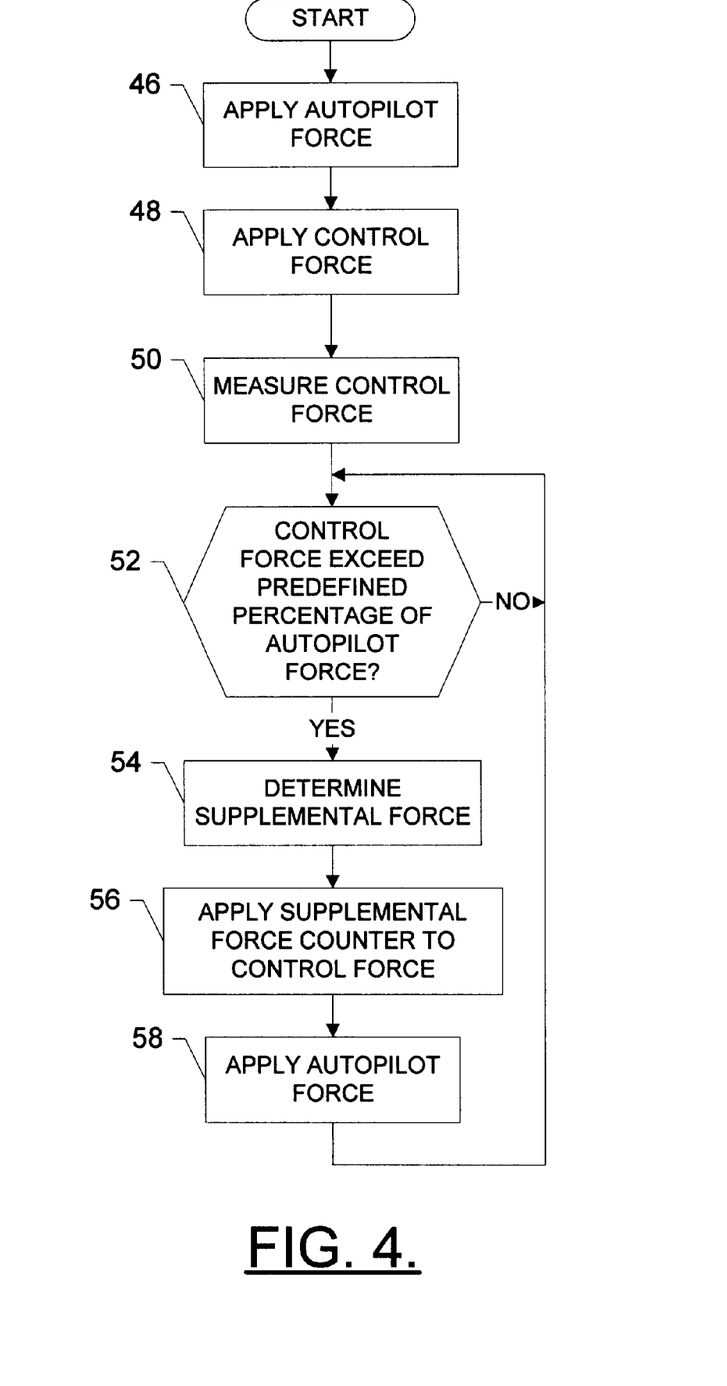
FIG. 4 is a flow chart illustrating various steps in a method of increasing autopilot authority in a vehicle according to one embodiment of the present invention.

Reference will now be made to FIG. 4, which illustrates a method of increasing the autopilot control authority of a vehicle, such as an aircraft, according to one embodiment of the present invention. The method begins by applying autopilot force, such as by an autopilot system 20, as shown in block 46. Then, as shown in block 48, as the autopilot force is applied, a control force is applied that is counter to the autopilot force, such as by an operator applying force to one or more control elements 12 of the vehicle in an attempt to override the autopilot force. As the control force is applied, the control force is measured, such as by force transducers 36, as shown in block 50.

After the control force has been measured, a determination is made as to whether the control force exceeds the autopilot force, or a predefined percentage of the autopilot force, as shown in block 52. If the control force does not exceed the autopilot force, or a predefined percentage of the autopilot force, the control force is repeatedly measured to determine if, at any point, the control force does exceed the autopilot force (or predefined percentage of the same). If the control force does exceed the autopilot force, or predefined percentage of the autopilot force, a supplemental force is determined, as shown in block 54. The supplemental force is determined such that the sum of the autopilot force and the supplemental force equals a total force greater than the control force. After the supplemental force has been determined, the supplemental force is applied with the autopilot force and counter to the control force, as shown in block 58. The control force therefore cannot override the autopilot force because the control authority of the autopilot system has been increased by the supplemental force. As the control force can vary, as described above, the control force is repeatedly measured and the method repeated to determine whether, and to what extent, to apply the supplemental force.

As described above, vehicles such as aircraft can include an Auto-GCAS. In such embodiments, whether to apply the supplemental force can be based upon whether the Auto-GCAS has determined that a collision avoidance maneuver within a defined period of time is required to avoid terrain. Thus, reference is now drawn to FIG. 5, which illustrates various steps in a method of increasing autopilot authority in a vehicle, where the vehicle includes an Auto-GCAS. As before, the method begins by applying autopilot force and control force, as shown in blocks 60 and 62. Then, as the control force is applied, the control force is measured, such as by force transducers 36, as shown in block 64. After the control force has been measured, a determination is made as to whether the control force exceeds the autopilot force, or a predefined percentage of the autopilot force, as shown in block 66. If the control force does not exceed the autopilot force, or a predefined percentage of the autopilot force, the control force is repeatedly measured to determine if, at any point, the control force does exceed the autopilot force (or predefined percentage of the same).

Figure 5:
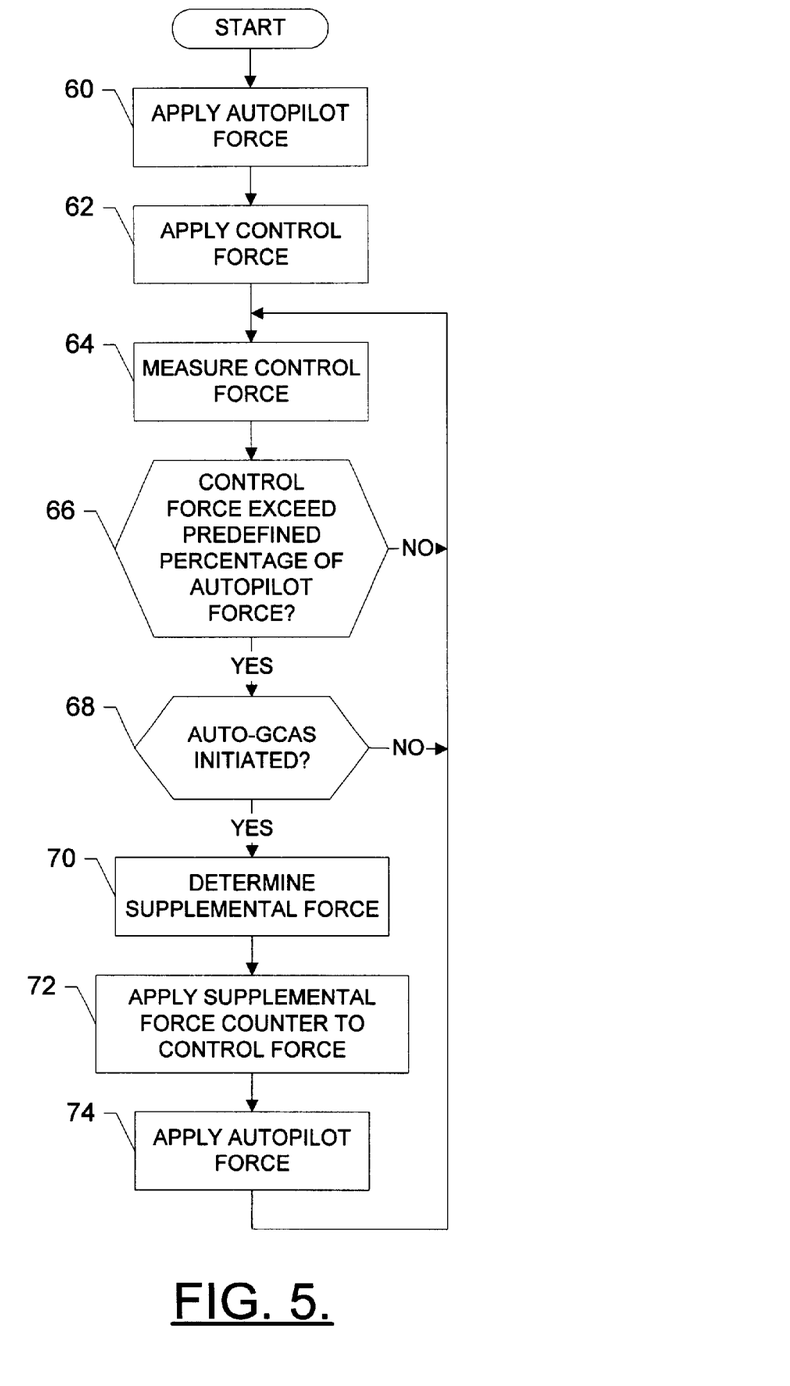
FIG. 5 is a flow chart illustrating various steps in a method of increasing autopilot authority in a vehicle according to another embodiment of the present invention.

In contrast to the previous embodiment, if the control force does exceed the autopilot force, or predefined percentage of the autopilot force, a determination is made as to whether the Auto-GCAS determined that a collision avoidance maneuver within a defined period of time is required to avoid terrain, such as by receiving an indication from the FMC 28, as shown in block 68. If the Auto-GCAS has not determined that such a collision avoidance maneuver is required to avoid terrain, the control force is repeatedly measured and the determination is repeatedly made as to whether the Auto-GCAS has determined that such a collision avoidance maneuver is required. Thus, if the control force exceeds the autopilot force (or predefined percentage thereof) and the Auto-GCAS has determined that such a collision avoidance maneuver is required, a supplemental force is determined, such as described above, as shown in block 70. Also as described before, after the supplemental force has been determined, the supplemental force is applied with the autopilot force and counter to the control force, as shown in block 72. In addition, as the control force can vary, as described above, the control force is repeatedly measured and the method repeated to determine whether, and to what extent, to apply the supplemental force.

Therefore, embodiments of the present invention provide a system, autopilot supplement assembly and method for increasing autopilot control authority, such as during automatic collision avoidance maneuvers. Advantageously, the system, autopilot supplement assembly and method of embodiments of the present invention are capable of increasing autopilot control authority in a vehicle, such as an aircraft, where the vehicle includes a mechanical flight control system. Advantageously, the amount of supplemental force applied to the torque tubes and, thus, the control surfaces, is based upon the amount of force imparted counter to the autopilot force, such as the force applied by an operator of the vehicle. Therefore, embodiments of the system, autopilot supplement assembly and method are capable of providing the benefits of the Auto-GCAS to vehicles such as aircraft that include mechanical control systems. Additionally, embodiments of the system, autopilot supplement assembly and method are adapted such that, should the autopilot supplement assembly fail, control force can be applied to override the autopilot force to thereby allow an operator to control the vehicle.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for increasing autopilot control authority in a vehicle comprising:

an autopilot system capable of automatically controlling the vehicle by applying a variable autopilot force to at least one control surface of the vehicle;

at least one control element capable of applying a variable control force to at least one control surface of the vehicle, wherein the control force acts on the at least one control surface counter to the autopilot force; and an autopilot supplement assembly connected to the control element and the at least one control surface of the vehicle, wherein the autopilot supplement assembly is capable of measuring the control force, wherein the autopilot supplement assembly is capable of determining a variable supplemental force based upon the measured control force, wherein the autopilot supplement assembly is also capable of applying the supplemental force to the at least one control surface that acts on the at least one control surface in concert with the autopilot force and counter to the control force, wherein the sum of the supplemental force and the autopilot force equals a total force that is greater than the control force.

2. A system according to claim 1, wherein the autopilot supplement assembly is capable of applying the supplemental force when the control force is at least a predefined percentage of a maximum autopilot force.

3. A system according to claim 2, wherein the autopilot supplement assembly is capable of applying the supplemental force when the control force is at least ninety percent of the maximum autopilot force.

4. A system according to claim 2, wherein the autopilot supplement assembly is capable of applying the supplemental force when the control force is greater than the maximum autopilot force.

5. A system according to claim 1, wherein the vehicle comprises an aircraft including a full control authority system capable of commanding the aircraft to perform one or more commanded maneuvers, and wherein the autopilot supplement assembly is capable of applying the supplemental force when the full control authority system initiates a commanded maneuver.

6. A system according to claim 5, wherein the full control authority system comprises an automatic ground collision avoidance system (Auto-GCAS) capable of determining that a collision avoidance maneuver within a defined period of time is required to avoid terrain, and wherein the autopilot supplement assembly is capable of applying the supplemental force when the Auto-GCAS determines the collision avoidance maneuver within a defined period of time is required.

7. A system according to claim 1, wherein the autopilot supplement assembly comprises:
at least one transducer mechanically connected to the control element capable of measuring the control force;
a controller electrically connected to the at least one transducer capable of determining the supplemental force based upon the control force measured by the at least one transducer; and
at least one cable tension servo electrically connected to the controller and mechanically connected to the at least one control surface, wherein the at least one cable tension servo is capable of applying the variable supplemental force to the at least one control surface.

8. A method of increasing autopilot control authority in a vehicle comprising:
receiving a measure of a variable autopilot force applied to at least one control surface of the vehicle to thereby control the vehicle;
receiving a measure of a variable control force applied to at least one control surface of the vehicle; and
determining a variable supplemental force that when applied to the at least one control surface acts in concert with the autopilot force and counter to the control force, wherein the sum of the supplemental force and the autopilot force equals a total force that is greater than the control force, and wherein the supplemental force is determined based upon the control force measured.

9. A method according to claim 8 further comprising applying the supplemental force to the at least one control surface.

10. A method according to claim 9, wherein applying the supplemental force comprises applying the supplemental force when the control force is at least a predefined percentage of a maximum autopilot force.

11. A method according to claim 10, wherein applying the supplemental force comprises applying the supplemental force when the control force is at least ninety percent of the maximum autopilot force.

12. A method according to claim 10, wherein applying the supplemental force comprises applying the supplemental force when the control force is greater than of the maximum autopilot force.

13. A method according to claim 9, wherein the vehicle comprises an aircraft including a full control authority system capable of commanding the aircraft to perform one or more commanded maneuvers, wherein applying the supplemental force comprises applying the supplemental force when the full control authority system initiates a commanded maneuver.

14. A method according to claim 13, wherein the full control authority system comprises an automatic ground collision avoidance system (Auto-GCAS) capable of determining that a collision avoidance maneuver within a defined period of time is required to avoid terrain, wherein applying the supplemental force comprises applying the supplemental force when the Auto-GCAS determines that a collision avoidance maneuver is required.

15. An autopilot supplement assembly for increasing autopilot control authority in a vehicle, wherein the vehicle includes an autopilot system capable of controlling the vehicle by applying a variable autopilot force to at least one control surface of the vehicle, said autopilot supplement assembly comprising:
at least one transducer mechanically connected to a control element of the vehicle, wherein the control element is capable of controlling the vehicle by applying a variable control force to at least one control surface of the vehicle, and wherein the at least one transducer is capable of measuring the control force;
at least one cable tension servo electrically connected to the controller and mechanically connected to the at least one control surface, wherein the at least one cable tension servo is capable of applying a variable supplemental force to the at least one control surface that acts on the at least one control surface in concert with the autopilot force and counter to the control force, wherein the sum of the supplemental force and the autopilot force equals a total force that is greater than the control force; and
a controller electrically connected to the at least one transducer and the at least one cable tension servo, wherein the controller is capable of determining the variable supplemental force based upon the control force measured by the transducer, and wherein the controller is capable of controlling the at least one cable tension servo to apply the supplemental force.

16. A autopilot supplement assembly according to claim 15, wherein the controller is capable of controlling the at least one cable tension servo to apply the supplemental force when the control force is at least a predefined percentage of a maximum autopilot force.

17. A autopilot supplement assembly according to claim 16, wherein the controller is capable of controlling the at least one cable tension servo to apply the supplemental force when the control force is at least ninety percent of the maximum autopilot force.

18. A autopilot supplement assembly according to claim 16, wherein the controller is capable of controlling the at least one cable tension servo to apply the supplemental force when the control force is greater than of the maximum autopilot force.

19. A autopilot supplement assembly according to claim 15, wherein the vehicle comprises an aircraft including a full control authority system capable of commanding the aircraft to perform one or more commanded maneuvers, and wherein the controller is capable of controlling the at least one cable tension servo to apply the supplemental force when the full control authority system initiates a commanded maneuver.

20. A autopilot supplement assembly according to claim 15, wherein the full control authority system comprises an automatic ground collision avoidance system (Auto-GCAS) capable of determining that a collision avoidance maneuver within a defined period of time is required to avoid terrain, and wherein the controller is capable of controlling the at least one cable tension servo to apply the supplemental force when the Auto-GCAS determines that a collision avoidance maneuver is required.

* * * * *